Figure 1:
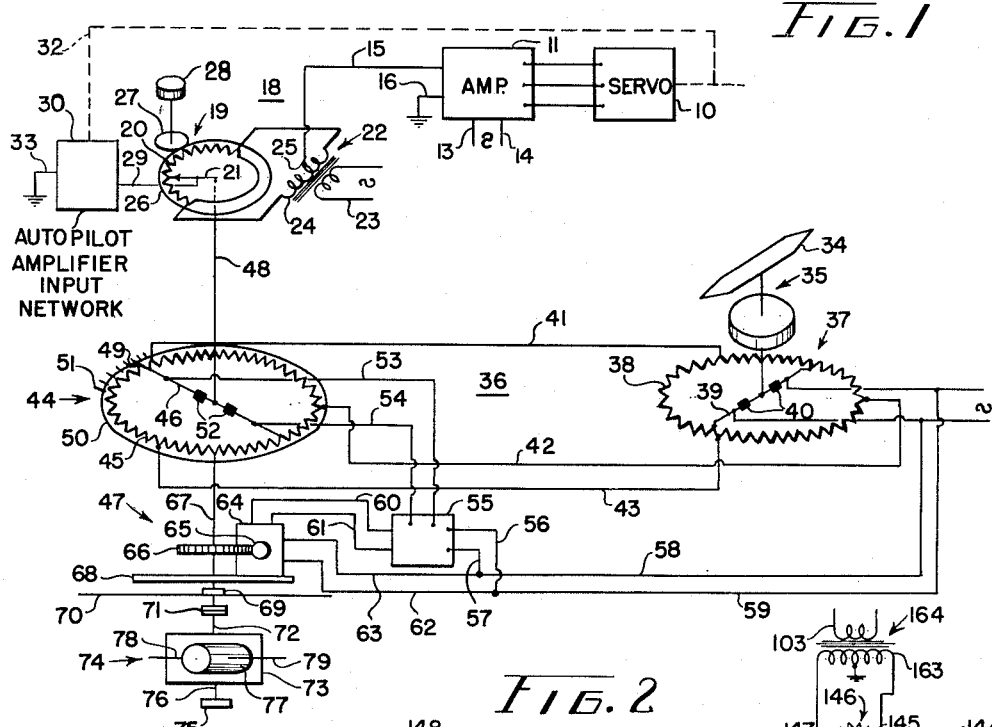

July 28, 1953　　　R. J. KUTZLER　　　2,647,233

AUTOMATIC STEERING APPARATUS

Filed April 16, 1949

INVENTOR.
ROBERT J. KUTZLER

BY George H Fisher

ATTORNEY

Patented July 28, 1953

2,647,233

UNITED STATES PATENT OFFICE 2,647,233

AUTOMATIC STEERING APPARATUS

Robert J. Kutzler, Minneapolis, Minn., assignor to Minneapolis-Honeywell Regulator Company, Minneapolis, Minn., a corporation of Delaware Application April 16, 1949, Serial No. 87,909

4 Claims. (Cl. 318—489)

This invention pertains to direction maintaining apparatus for dirigible craft such as aircraft, water craft, and the like. This invention more particularly concerns direction maintaining means which may be utilized to control automatic steering apparatus for dirigible craft.

An object of this invention is to provide a direction maintaining apparatus in which an indicator is controlled by a free gyroscope and a magnetic compass and in which the primary operation of the indicator is derived from the gyroscope with means for correcting the position of the indicator by readjusting the same with respect to the gyroscope in response to deviation in relative position of said compass and gyroscope.

It is a further object of this invention to provide an epicyclic gear train between an indicator and a directional gyroscope in such manner that the fixed axis of the gear train is co-linear with the axis of the indicator and of the gyroscope and wherein the movable axis of said gear train is operated in accordance with change in relative position of said gyroscope and a magnetic compass.

It is a further object of this invention to utilize the means for positioning said indicator for adjusting the controller of an automatic steering mechanism to maintain a craft on a magnetic heading.

It is a further object of this invention to provide means for readjusting the controller in order to change the magnetic heading on which the craft is to be maintained.

It is a further object of this invention to provide an automatic steering mechanism for dirigible craft which is controlled by a potentiometric controller providing continuous control and wherein said controller is primarily adjusted by a free directional gyroscope, said controller being subsequently readjusted by means under the control of a magnetic compass so that the magnetic heading is maintained. Additional means are provided in said steering mechanism to alter the magnetic heading to be maintained in selected angular amounts and alternatively to alter the magnetic heading to be maintained at a selected angular rate.

The above and further objects and novel features of the invention will more fully appear from a consideration of the detailed description when the latter is read in connection with the accompanying drawing.

Figure 2:
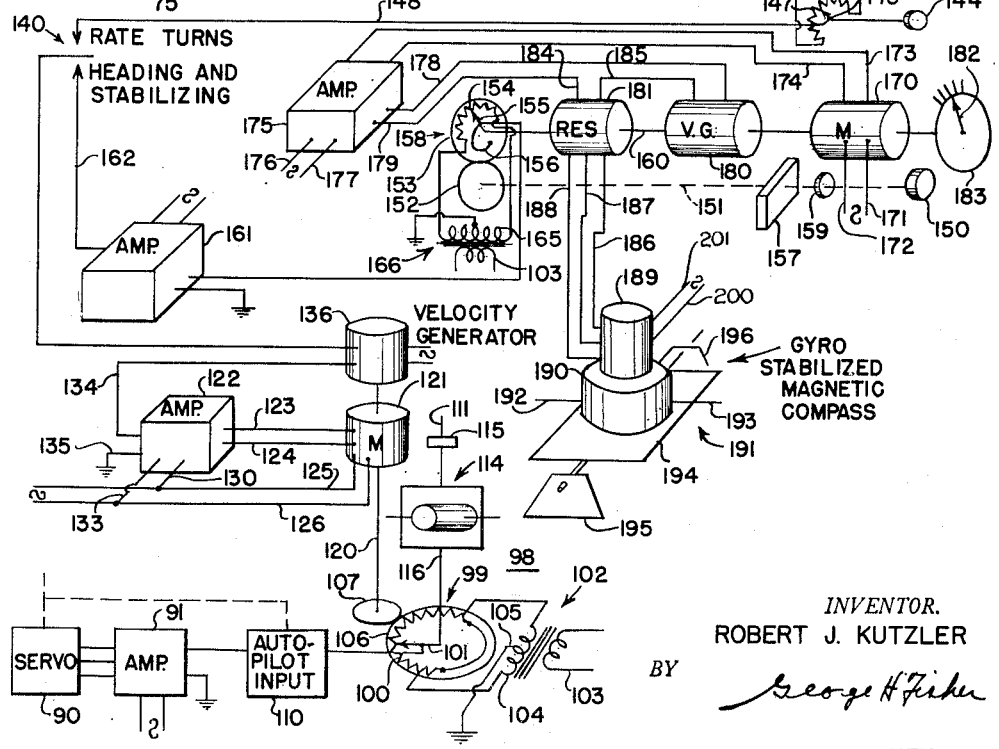

In the drawing wherein like reference characters refer to like parts:

Figure 1 is a diagrammatic representation of one form of the novel apparatus embodying the present invention; and Figure 2 is a diagrammatic representation of a second form of the novel apparatus embodying the present invention.

Referring now to Figure 1 of the drawing for a more detailed description of the automatic steering mechanism of the present invention, a control surface (not shown) for controlling the direction in azimuth of a dirigible craft is operated from a servomotor 10. The servomotor 10 is reversibly controlled by an amplifier 11. The amplifier-servomotor combination may be of the type well known in the art wherein the direction of rotation of the servomotor depends upon the phase relationship of the voltage across power input terminals 13, 14 of amplifier 11 with respect to the voltage across the signal input terminal connections 15, 16 of amplifier 11. The amplifier-servomotor combination may be of the type disclosed in United States Patent 2,425,734 of W. H. Gille et al.

The signal input connections 15, 16 of amplifier 11 are included in a variable impedance circuit which additionally comprises impedance network 18, lead 29, autopilot amplifier input network 30, and lead 33 which is common to amplifier ground connection 16.

The variable impedance network 18 consists of a directional control potentiometer 19 having a resistor 20, a slider 21 coacting with the resistor and a transformer 22 having a primary winding 23 connected to the ship's supply and a secondary winding 24. The resistor 20 is connected across the ends of secondary winding 24 of transformer 22. Connection 15 extends from amplifier 11 to a center tap 25 of secondary winding 24. The resistor 20 is supported by a gear member 26 which in turn (by means not shown) is rotatably carried by the craft. The gear 26 meshes with a pinion 27 which may be operated by a course changer 28. The slider 21 is stabilized on a given direction by means to be described.

It will be appreciated that with the network 18 mounted on a craft with the slider 21 at the mid point of resistor 20 the potential of wiper 21 is the same as that of center tap 25 of secondary winding 24. It will also be apparent that if the resistor 20 is moved with respect to the stabilized slider 21 either by movement of the craft or by adjustment of the gear 26 by the course changer 28 that the slider 21 and center tap 25 are at different potentials. Moreover, the direction or phase of this potential difference will depend upon the direction of displacement of resistor 20 with respect to slider 21. This potential difference between slider 21 and center tap 25 constitutes an electrical signal and the potentiometer 19 constitutes a signal generator or pick-off responsive to changes in direction of the craft or to operation of the course changer.

The input network 30 may be an elaborate network of series connected variable potentiometers such as disclosed in my application Ser. No. 22,841, filed April 23, 1948. However, for facilitating the understanding of the invention, the network 30 may be considered analogous to the potentiometer 18 of Patent 2,425,734 mentioned above. The network 30 is operated by a follow-up connection 32 extending from the servomotor 10 analogous to the operation of the follow-up potentiometer 18 of the aforesaid patent. A lead 29 extends from the slider 21 of potentiometer 19 to the input network 30. A lead 33 extends from the network 30 to ground which is common with the grounded lead 16 of amplifier 11.

The stabilizing apparatus consists of a magnetic compass 35, an electrical differential or position comparing device 36 consisting of a magnetic compass position potentiometer 37, and a gyro stabilized resolver or follow-up potentiometer 44, a directional gyro 74, an epicyclic gear train 47, an error signal reducing motor 64, and an error signal responsive amplifier 55. The compass position potentiometer 37 consists of a circular resistance unit 38 and a double contact arm 39, which engages the resistance unit. The double contact arm is positioned by a standard compass 35 to assume a position according to the position of the compass needle 34. The end portions of the double contact arm 39 are suitably insulated from the positioning means by insulating segments 40. The double contact arm may be connected to a source of alternating voltage which may be the ship's supply. Leads 41, 42 and 43 which extend from equal angularly spaced points of resistor unit 38 are connected to corresponding points of resistor unit 45 of the follow-up potentiometer 44. A double contact arm 46 coacts with the resistor unit 45 of potentiometer 44. A vertical shaft 48 extends from the center of double contact arm 46 and is connected to the slider 21 of potentiometer 19. An extension 49 of one end of the double contact arm 46 serves as an index which coacts with a magnetic heading dial 50 bearing suitable indicia 51. The ends of the double contact arm 46 which bear on the resistor 45 and which are insulated from the shaft 48 by suitable insulating segments 52 are connected respectively by leads 53 and 54 to the position error amplifier 55.

The amplifier 55 is of the A. C. discriminator type and has power input connections 56, 57 connected by leads 58, 59 to the ship's supply. Output connections 60, 61 of amplifier 55 are connected to one phase winding of a capacitor type induction motor 64. The other phase winding of the motor 64 is connected by suitable leads 62, 63 to the supply leads 58, 59. The motor 64 is reversibly controlled by the amplifier 55 in accordance with the phase relationship of the voltage across the signal input terminals of amplifier 55 with respect to the voltage of the ship's supply. Such amplifier-capacitor motor combinations are old in the art, an example being disclosed in the patent to Beers, 2,020,275.

The motor 64 drives through a suitable reduction gearing (not shown), a worm 65 which meshes with a worm gear 66. The gear 66 is secured to a shaft 67 which drives the double contactor 46 of potentiometer 44. The shafts 67 and 48 are coaxial.

The motor 64 is carried by a turntable 68 supported by bearing means 69 on a base 70. The turntable 68 is operatively driven through a coupling 71 from a trunnion 72 of the vertical gimbal ring 73 of a directional gyro 74. A lower trunnion 76 of the gimbal ring 73 is suitably supported in a bearing 75. The directional gyro 74 includes a rotor, not shown, carried on a horizontal spin axis in a casing 77. The casing 77 in turn is carried by trunnions 78 and 79 in the vertical gimbal ring 73. The axis of trunnions 78, 79 is horizontal and at right angles to the spin axis of the gyro rotor. The arrangement is such that the axis of rotation of the trunnions 72, 76 of the vertical gimbal ring 73 of gyro 74, the turntable 68, and the gear 66 are colinear.

Considering now the operation of the arrangement described and shown in Figure 1, the double arm contactor 46 of potentiometer 44 must assume a position at right angles to the position of the double contact arm 39 of potentiometer 38 in order that there be no difference of potential across the leads 53 and 54.

Automatic steering or stabilized course control is provided by the directional gyro 74. This occurs in the following manner. Assuming that the craft is on a selected course with the slider 21 at the mid point of its resistor 20, the input circuit of amplifier 11 may be assumed in balanced condition with the servo balance potentiometer included in network 30 at balance. If the dirigible craft swings off its heading, the gear 26 carried by the craft rotates with respect to the stabilized slider 21. The slider 21 is maintained in space by the directional gyro 74 through the turntable 68, the gear train 47, and the shafts 67 and 48. The displacement of resistor 20 with respect to slider 21 sets up a difference of potential between slider 21 and the center tap 25 of secondary winding 24 resulting in an unbalance in the input circuit of amplifier 11. The amplifier 11 causes the operation of the servomotor 10 which positions the course control surface in a manner to return the craft to the stabilized heading. As the craft approaches the stabilized heading, the amount of control surface displacement decreases until on attaining the desired heading the control surface is again centered. The index 49 indicates on dial 50 the deviation of the craft from magnetic heading desired.

Over a period of time, the directional gyro 74 tends to wander from its original position. In such circumstance, the heading of the craft would change to follow the wandering of the gyroscope 74. To permit the free gyroscope 74 to wander and yet to prevent such wandering to be reflected in the positioning of the slider 21 is the function of the magnetic compass 35 and the electrical differential 36.

With the double contact arm 46 in the null or no signal position with respect to the position of contactor 39, the signal input leads 53, 54 of amplifier 55 are at the same potential. If the gyroscope 74 tends to wander, it will through the turntables 68 and gear train 47 displace the contactor 46 and the slider 21. The contactor 46 has now been displaced from its null position with respect to contactor 39, and a voltage is applied across the input terminals of amplifier 55. The amplifier 55 causes the operation of the capacitor motor 64. The pinion 65 driven by the motor 64 is the member of the epicyclic gear train 47 whose axis of rotation is movable about two axes. It rotates gear 66 and contactor 46 to a null position. At this time the input circuit of error signal amplifier 55 is in balanced condition and the operation of motor 64 stops. The positioning of the contactor 46 has also repositioned the slider 21 with respect to the free gyroscope 74 and has also repositioned the index 49 with respect to the indicating dial 50. Thus the gyroscope 74 is permitted to assume a new position with respect to the slider 21 and index 49 whereby the original course of the craft is maintained and indicated.

While the motor 64 and its pinion 65 are responsive to changes in relative position of the magnetic compass 35 and the directional gyro 74 due to wandering of the gyroscope, the temporary deviations of alignment of the gyroscope and compass 35 due to oscillations of the compass are not corrected by the motor 64 due to the slow response of its output gear 65 to such temporary deviation signals.

In the above construction, there has been provided to advantage a free gyroscope, which may by symmetrically constructed and free of compass slaving torque motors, for positioning a controller of an automatic steering apparatus but which controller is corrected for long period deviations between a magnetic compass and the gyroscope.

*Species of Figure 2*

Reference is made to Figure 2 in conjunction with the following detailed description of a second form of the invention. In Figure 2, a servomotor 90 operates the control surface of the craft to maintain or change the heading to be maintained. The servomotor is reversibly controlled by an amplifier 91. The servomotor 90 and amplifier 91 are similar to the amplifier 11 and servomotor 10 of Figure 1.

The signal input circuit of amplifier 91 includes a variable impedance network 98 corresponding with network 18 of Figure 1 and an input network 119 corresponding with the network 30 of Figure 1. The impedance network 98 includes the course control potentiometer 99 having a circular resistor 100 and a slider 101 contacting the same. The resistor 100 is connected across a secondary winding 104 of a transformer 102 having a primary winding 103 connected to the ship's supply. A center tap 105 of secondary winding 104 is connected to ground which is common to the ground connection of a signal input connection of amplifier 91.

The slider 101 is stabilized by a free directional gyroscope 114 similar to the directional gyroscope 74 of Figure 1. To this end the slider 101 is secured to the lower trunnion 116 of the outer gimbal ring of the vertical gyro 114. The upper trunnion 111 of the outer gimbal ring is suitably journaled in bearing 115. The supporting bearing for lower trunnion 116 has been omitted for clearness.

The resistor 100 is carried by a gear member 106. The gear member 106 is in mesh with a driving gear 107. The network 98 constitutes a signal generator or course control pick-off. Such signals are obtained by relative displacement of the slider 101 with respect to the resistor 100.

For the usual stabilizing on a given heading by the gyro 114, the resistor 100 is not displaced with respect to the craft. The resistor 100 may be displaced with respect to the craft by operation of gear 107 in mesh with resistor supporting gear 106. Correction of a gyro heading, course changes of selected angular amounts, and changes in heading at selected rate are secured by operating gear 107. For such operations, the gear 107 is carried by the output shaft 120 of a capacitor type induction motor 121 which is hereinafter referred to as the steering motor.

The steering motor 121 has one of its phase windings connected to the ship's supply by means of leads 125, 126. The other phase of the motor 121 is connected by leads 123, 124 to the output of a discriminator amplifier 122. The amplifier 122 is provided with signal input connections 134 and 135 with additional power input connections 130, 133 connected to the ship's supply. The direction of rotation of steering motor 121 depends upon the phase relationship between the voltage across the input connections 134, 135 and that across the supply leads 125, 126.

The signal input connections 134, 135 of amplifier 122 are in series with the output of a velocity generator 136 and through a three position switch 140 to a source of voltage to be described. The operation of the amplifier, velocity generator and steering motor is such that when an initiating control signal of a particular value is applied to the amplifier 122 the steering motor 121 operates. The motor 121 drives the velocity generator 136 so as to generate a voltage which opposes the control voltage. Ultimately therefore the motor 121 attains a speed dependent upon the amount of control voltage initially applied. The steering motor, amplifier, velocity-generator combination may be similar to that disclosed in the aforesaid application Ser. No. 22,841.

The various means for providing a signal for initiating the operation of amplifier 122 will be described. Turns at selected rates are initiated from a rate turn knob 144 which adjusts a slider 145 of a rate turn potentiometer 146 with respect to the resistor 147. A lead 148 extends from the slider 145 to the upper contact of switch 140. The resistor 147 of potentiometer 146 is connected across a secondary winding 163 of a transformer 164, the winding 163 having a grounded center tap. The secondary of such transformer may be energized by a primary winding 103 which may be common to transformers 102, 164 and 166.

Changes in heading in selected angular amounts is controlled by a course turn knob 150. The knob 150 is carried by an axially slidable shaft 151 which supports at its opposite end a gear 152. The shaft 151 is carried in a bracket 157. When moved toward the left, a stop 159 on shaft 151 engages the bracket 157. A similar stop (not shown) may be provided for limiting the rightward movement of the shaft. In its right position, the pinion 152 on shaft 151 meshes with a gear 153. The gear 153 supports a resistor 154 of a course change potentiometer 158. The slider 155 of the course change potentiometer is mounted on an extended continuous shaft 160. A biasing or centering spring 156 is secured to the slider 155 at one end and to the gear 153 at the other end. When the gears 152 and 153 are demeshed the spring centers the resistor and slider. The resistor 154 is connected across a grounded center tapped secondary winding 165 of a transformer 166.

Any voltage signal developed in potentiometer 158 is applied to a discriminator limit amplifier 161. The amplifier 161 may be similar to amplifier 150 of application Ser. No. 22,841. Such amplifier 161 as is also disclosed in the aforesaid application provides an output voltage of fixed value but of positive or negative value with respect to ground depending on the phase of the input signal applied thereto. The output voltage of amplifier 161 is transmitted by lead 162 which corresponds with lead 258 of the aforesaid application. Lead 162 extends from amplifier 161 to the lower contact of the three position switch 140.

Reverting to the continuous shaft 160 which supports the slider 155 of potentiometer 158, this shaft is driven by a capacitor type induction motor 170. One phase winding of the motor 170 is connected by leads 171, 172 to the ship's supply line. The other phase winding of motor 170 is connected across the output of a magnetic course amplifier 175 by leads 173, 174. Amplifier 175 has power input leads 176, 177 extending to the ship's supply. The amplifier 175 includes signal input connections 178, 179. The shaft 160 carries a rotor of a velocity generator 180 and the rotor of a resolver or follow up potentiometer 181. The shaft 160 further carries a pointer 182 which coacts with an indicia bearing magnetic heading dial 183.

Returning to a further discussion of the amplifier 175, the amplifier, like amplifiers 55, 122 is of the known A. C. discriminator type having two alternatively operable tubes in its output stage. The voltage across the output connections 173, 174 of amplifier 175 is either in phase with the line voltage across connections 176, 177 or one half cycle out of phase depending on which tube within the amplifier operates. The current through the amplifier phase winding of motor 170 therefore will either lag the line voltage by one quarter cycle when the signal is in phase with the line voltage or lead the line voltage one quarter cycle when the signal is out of phase. The line phase winding of motor 170 has a condenser in series therewith, consequently the current through the winding connected to the line is in phase with the voltage. Thus there is a quarter cycle lead or lag of the current through the amplifier winding with respect to the current in the line winding which lag or lead controls the direction of rotation of motor 170.

The signal input terminals 178, 179 of amplifier 175 are included in an input circuit which includes the secondary winding of a velocity generator 180 and the rotor of a resolver 181 which additionally furnishes a control voltage. The output voltages of the velocity generator 180 and the resolver 181 are algebraically added and applied to the amplifier connections 178, 179 so as to reduce any tendency of the motor 170 to hunt.

The velocity generator 180 is similar to the velocity generator 136 having a secondary winding forming the output member which although stationary is associated with a stationary primary winding by a rotor.

The resolver 181 or follow up potentiometer is similar to the follow up potentiometer 44 of Figure 1. The output connections 184, 185 of potentiometer 181 correspond with the connection 53 and 54 of Figure 1. The resistor unit (not shown) of potentiometer 181 is associated by way of leads 186, 187, 188 with a corresponding resistor unit of a compass operated potentiometer. The double arm contactor (not shown) of such compass potentiometer is connected by leads 190, 191 to the ship's supply.

It is to be understood that a magnetic compass corresponding with compass 35 of Figure 1 and a magnetic compass operated potentiometer are contained within the casing 189.

The compass-potentiometer casing 189 is supported on a rotor casing 190 of a known vertical gyro 191. The casing 190 supports a rotor (not shown) for rotation about a vertical axis. The casing in turn is carried by trunnions 192, 193 in a horizontal gimbal ring 194. The gimbal ring 194 in turn is supported on a horizontal axis by bearing blocks 195, 196 at an angle perpendicular to the axis of trunnions 192, 193. The axis of trunnions 192, 193 and that of the gimbal ring 194 in blocks 195, 196 are horizontal and at right angles to the spin axis of the rotor within casing 190.

The mounting of the magnetic compass and its potentiometer on the vertical gyro 191 will be referred to briefly. It is well known that in order for a magnetic compass to be accurate it should respond only to the horizontal component of the earth's magnetic field. However, if the compass should become tilted in any way, it is affected not only by the horizontal field but also by the vertical component of the earth's magnetic field. To avoid subjecting the compass to the vertical component of the earth's magnetic field, the compass has been mounted upon the gyroscope 191. The gyroscope is provided with conventional means not shown to maintain its rotor in a vertical position with respect to the earth consequently it will be readily apparent that regardless of pitch or roll of the craft the gyroscope and thus the compass will be maintained stable about a true vertical. Thus the magnetic compass will be subject only to the operation of the horizontal component of the earth's magnetic field and magnetic errors will not be applied to the compass.

The operation of the arrangement shown in Figure 2 will now be considered. It is apparent with the switch 140 in the mid position shown, the input circuit of amplifier 122 is not completed therefore the steering motor 121 is not operated. The free gyroscope 114 controls the position of the slider 101 of potentiometer 99. The craft is stabilized on the heading determined by the position of the gyro.

If gyro stabilizing with additionally magnetic compass supervision be desired, the three position switch 140 is moved to the down position. The gyroscope 114 through the controller 99 controls the operation of the steering mechanism motor 90 through amplifier 91.

Should the gyroscope wander over a period of time, it will operate the slider 101 with respect to resistor 100 and therefore cause the craft to deviate from the magnetic heading on which it is desired that the craft be stabilized. The compass within casing 189 in response to change of heading displaces its contactor relative to its resistor consequently the contactor operated by the magnetic compass is not in a position corresponding with the contactor of the resolver 181. A signal is obtained from resolver 181 which is applied to the amplifier 175. The amplifier 175 operates the motor 170 which through its shaft 160 drives the velocity generator and the contactor of resolver 181 to a null position.

Movement of the shaft 160 also positions the pointer 182 to indicate the new magnetic heading of the craft and also positions the slider 155 of potentiometer 158 with respect to its resistor 154. A signal is derived from potentiometer 158 which is applied to the limit amplifier 161. The amplifier 161 operates and provides a fixed signal through lead 162 and three position switch 140 in series with the output of velocity generator 136 to the steering motor amplifier 122.

The steering motor amplifier 122 causes the operation of steering motor 121 which through gearing 107, 106 moves the resistor 100 with respect to the slider 101. At the same time the steering motor 121 drives the velocity generator 136 which develops a signal which is algebraically added to the signal from amplifier 161. The steering motor 121 therefore rotates at a speed determined by the magnitude of the fixed signal from amplifier 161.

The movement given to the resistor 100 by steering motor 121 is in such direction as to cause the craft to return to the magnetic heading desired. As the craft returns to the desired magnetic heading the relative positions of the magnetic compass operated potentiometer and the follower or resolver potentiometer 181 is altered whereby an opposing signal is applied to the amplifier 175. The amplifier 175 now causes the operation of motor 170 in an opposite direction thereby moving the slider 155 of potentiometer 158 back toward its normal position on resistor 154 thus stopping operation of amplifiers 161, 122 and steering motor 121. As the craft moves back toward the original magnetic heading the index 182 moves back over the dial 183 toward the desired magnetic heading. Upon the attainment of the desired magnetic heading the potentiometer 158 is in balanced condition and the index 182 is pointing to the original magnetic heading with the resolver and magnetic compass operated potentiometers in corresponding positions. The slider 101 is at the center of resistor 100 which has changed its position with respect to the craft.

If a change of heading of selected angular value be desired, the course turn knob 150 is rotated in accordance with the amount of turn to be made. The rotation of knob 150 rotates the gears 152 and 153 and displaces the resistor 154 carried by gear 153 with respect to slider 155. A signal from potentiometer 155 is applied to the limit amplifier 161. The operation of amplifier 161 applies a fixed signal through lead 162 and the three position switch 140 to the amplifier 122 in a circuit including the output winding or secondary winding of velocity generator 136. The motor 121 now rotates and through gearing 107, 106 displaces the resistor 100 with respect to the slider 101. A signal from the course control potentiometer 99 is applied to the autopilot amplifier 91 which causes the servomotor 90 to operate and position the control surface.

As the craft changes its heading, the compass operates potentiometer and the follow up potentiometer 181 are relatively displaced from a null position, and a signal is applied to the amplifier 175. The amplifier 175 causes operation of the motor 170 which restores the resolver to a null position with respect to its control potentiometer. The motor 170 also positions the index 182 in accordance with the change in magnetic heading to be made. The motor 170 drives the slider 155 toward the center position of resistor 154.

As the craft changes its heading, it carries with it the resistor 100 which now moves with respect to slider 101 in an opposite direction to that imposed upon it by rotation of motor 121. This causes an unbalance in the input circuit of the autopilot amplifier 91 whereby the control surface is moved back toward normal position. When the craft has changed its heading in accordance with the amount set up on the turn knob 150, the slider 101 is at the center of resistor 100 and the resolver or follower potentiometer 181 is in a null position with respect to the magnetic compass operated potentiometer. Also the potentiometer 158 is in balanced condition.

When selected rate turns are to be made the three position switch 140 is moved to the upper position in the figure. The control knob 150 along with its gear 152 is moved inwardly or leftward to disengage gears 152 and 153. If there existed any relative displacement of resistors 154 and 155 the centering spring 156 removes such difference in position. The rate turn knob 144 is now rotated in either direction and to an extent depending upon the direction and the rate of turn to be maintained. The signal from the rate turn potentiometer 146 is applied through the three position switch 140 to the steering motor amplifier 122. The steering motor 121 in response to the operation of the amplifier 122 drives the gear 107 and through gear 106 the resistor 100 of potentiometer 99. The steering motor 121 drives its velocity generator whose output winding or secondary winding is in series with the signal from the rate turn potentiometer 146. The signals are algebraically added and applied to the amplifier 122 whereby the speed of rotation of motor 121 is determined by the signal provided by the rate turn potentiometer 146.

The resistor 100 is rotated in one direction by motor 121 to displace it with respect to the gyro stabilized wiper 101. The turning of the plane resulting from the operation of the servomotor 90 and amplifier 91 in response to the initial relative movement of slider 101 and the resistor 100 is in an opposite direction. Should the motor 121 tend to increase the displacement of resistor 100 with respect to slider 101 the rate of turn of the craft will increase accordingly and tend to prevent such increase in displacement. Consequently the craft will rotate or change heading at a rate determined by the amount of signal obtained from the rate of turn potentiometer 146.

Due to the changes in heading of the craft there is a displacement between the compass and the craft consequently the magnetic compass operates its potentiometer so that the respective contactors of the follow up potentiometer 181 and the compass operated potentiometer are displaced from a null position. A signal from the follow up potentiometer or resolver 181 is thus applied to the amplifier 175 causing the operation of motor 170. The motor 170 will drive the index 182 at a rate dependent upon the rate of change of heading of the craft and will drive the contactor of follow up potentiometer 181 to null position. Due to the continuous change in heading of the craft the motor 170 continuously drives its index 182. The slider 155 and resistor 154 of potentiometer 158 are maintained centered with respect to each other by the spring means 156.

As the craft approaches the desired heading to be maintained, the rate turn knob 144 is moved back toward center position on resistor 147. The signal on amplifier 122 therefore decreases and the motor 121 stops rotating. The motor 121 no longer rotates the resistor 100 with respect to its slider 101.

Originally it was stated that the motor 121 positioned the resistor 100 with respect to the slider 101 to initiate the turn of the craft. With the motor 121 at this time no longer rotating the turn of the craft is in such direction as to move the resistor 100 with respect to slider 101 oppositely to that provided by the initial operation of motor 121. Consequently the input circuit of the amplifier 91 is unbalanced in an opposite direction resulting in the movement of the control surface by the servomotor 90 back to its normal position or streamlined position.

As the control surface is moved back toward streamline position, the aircraft steadies on the new magnetic heading. The index 182 has been positioned with respect to its dial 183 by the motor 170 to correspond with the new magnetic heading. The resolver 181 is in a null position with respect to the magnetic compass operated potentiometer. The course turn knob 150 may be moved toward the right to engage the gears 152 and 153 for any subsequent operation.

While only two structures embodying the present invention have been shown in the drawings, it is to be understood that various changes may be made in these structures without departing from the scope of the present invention. Therefore, it is intended not to limit the invention by the description herein given, but solely by the scope of the following claims.

What is claimed is:

1. Steering apparatus for a dirigible craft having power means for reversibly actuating a control surface on said craft for changing its heading, said apparatus comprising: an electronic amplifier having its output connected to said power means for controlling the direction of rotation of said power means; a balanceable control circuit connected to the input of said amplifier including a potentiometer having a slider part and resistor part relatively displaceable from a null position; a free directional gyroscope means for adjusting one part of said potentiometer; means for adjusting the other part of said potentiometer; a compass reponsive to the earth's magnetic field; and means controlled by said compass and effective upon relative movement of said craft and compass for operating the other part adjusting means for stabilizing the heading of said craft.

2. Steering mechanism for a dirigible craft having a control surface for changing the heading of said craft, said apparatus comprising: power means for operating the control surface; control means for starting and stopping said power means; means including a two part pick-off for operating said control means on relative displacement of said parts; a gyroscope for positioning one part of said pick-off; motor means for positioning said other pick-off part; a magnetic compass; an electrical differential for deriving a signal and having two mechanical positional inputs one responsive to relative movement of said craft and compass and the other responsive to the relative movement of said craft and motor means; and means for operating said motor means in accordance with the magnitude of said signal from said differential for nulling said differential through one mechanical input and relatively displacing said pick-off parts for maintaining the craft on a magnetic heading.

3. Heading control mechanism for an aircraft having a steering control surface, said apparatus comprising: a magnetic compass, an electrical differential device actuated by said compass for producing an electrical signal upon relative movement of said craft and compass, an amplifier operated by said signal, a motor having a low rotation rate and connected to said amplifier and operatively connected to said differential for nulling said signal, a second signal producing device positioned by said motor, a signal responsive means including a second motor controlled from said second signal producing device, a free gyroscope rotated relative to said craft about an axis upon change in heading of said craft, a third signal producing device operatively connected to and responsive to the algebraic sum of the rotations of the gyroscope and second motor, a manually operable fourth signal producing device for changing craft heading at a selected rate, selectively operable means for rendering said signal responsive means and second motor non-responsive to said second signal producing device and responsive to the fourth signal producing device, a velocity signal generator in series with said fourth signal producing device for limiting the speed of the second motor to the magnitude of the fourth signal, power means for operating the control surface of the craft, means for controlling said power means from the third signal producing device, and means for maintaining the second signal producing device in a null condition during control of said signal responsive means and second motor from the fourth signal producing device to avoid sudden operation of said second motor upon subsequently rendering said signal responsive means and second motor responsive to said second signal device.

4. Heading control apparatus for an aircraft having a control surface for steering said craft, said apparatus comprising: a magnetic heading signal providing means comprising two relatively stationary interconnected members, a rotor associated with one member and rotatable relative thereto, and means for energizing the rotor in accordance with the changes in magnetic heading whereby signals proportional to change in heading are supplied to the rotor; signal responsive means including a motor having a shaft operatively connected to said rotor and controlled by said heading signal for driving said rotor to reduce the signal supplied to the rotor; a variable source of voltage having two relatively adjustable members for varying the magnitude of the voltage; means for relatively adjusting said members of said voltage source from said motor shaft; a first amplifier providing a fixed output signal and connected to be responsive to the variable voltage source; a second amplifier connected to the output of the first amplifier and responsive to the fixed signal; a second motor controlled from the second amplifier; a velocity signal generator driven by the second motor and connected to the second amplifier in opposition to the fixed signal to proportion the motor speed to the magnitude of the fixed signal; a second variable voltage source having two relatively displaceable members to vary the magnitude of the voltage produced thereby; means for relatively displacing the members of the second voltage source from the second motor; a gyroscope responsive to changes in craft heading for modifying the relative position of the adjustable members of said second variable voltage source; power means for operating said control surface; and means for controlling said power means from said second variable source of voltage, whereby upon changes in heading of said craft due to drift of said gyroscope said magnetic heading signal providing means returns said craft to said original heading at a rate dependent upon said fixed signal.

ROBERT J. KUTZLER.

(References on following page)

References Cited in the file of this patent

UNITED STATES PATENTS

| Number | Name | Date |
|---|---|---|
| 1,436,280 | Minorsky | Nov. 21, 1922 |
| 1,958,258 | Alexanderson | May 8, 1934 |
| 2,387,795 | Isserstedt | Oct. 30, 1945 |
| 2,439,701 | Stuart | Apr. 13, 1948 |
| 2,520,922 | Framme et al. | Sept. 5, 1950 |
| 2,539,411 | Osval et al. | Jan. 30, 1951 |
| 2,597,077 | Douglas | May 20, 1952 |
| 2,602,611 | Glenny | July 8, 1952 |
| 2,614,335 | Noxon | Oct. 21, 1952 |

FOREIGN PATENTS

| Number | Country | Date |
|---|---|---|
| 49,251 | France | Nov. 12, 1938 |
| | (Addition to No. 793,301) | |
| 586,506 | Great Britain | Mar. 20, 1947 |